United States Patent [19]
Johnson

[11] Patent Number: 5,108,808
[45] Date of Patent: * Apr. 28, 1992

[54] COFFEE CARAFE

[76] Inventor: Kendrick A. Johnson, 8242 Queen Ave. So., Bloomington, Minn. 55431

[*] Notice: The portion of the term of this patent subsequent to Nov. 7, 2006 has been disclaimed.

[21] Appl. No.: 432,522

[22] Filed: Nov. 6, 1989

Related U.S. Application Data

[63] Continuation-in-part of Ser. No. 157,746, Feb. 18, 1988, Pat. No. 4,879,146.

[51] Int. Cl.⁵ .................. A47J 27/00; A47G 19/14
[52] U.S. Cl. ...................... 428/35.7; 215/1 C; 220/94 R; 220/94 A; 428/215; 428/220; 222/475.1
[58] Field of Search ........ 428/35.7, 215, 220, 428/500; 215/1 C; 222/475.1, 475; 126/390; 220/94 R, 94 A

[56] References Cited

U.S. PATENT DOCUMENTS

| | | | |
|---|---|---|---|
| 2,964,794 | 12/1960 | Peilstocker et al. | 215/1 C |
| 3,114,484 | 12/1963 | Serio | 222/475.1 |
| 3,800,988 | 4/1974 | Karlen et al. | 222/475.1 |
| 3,847,867 | 11/1974 | Health et al. | 524/233 |
| 3,847,869 | 11/1974 | Williams, III | 528/170 |
| 3,850,885 | 11/1974 | Takekoshi et al. | 528/170 |
| 3,852,242 | 12/1974 | White | 528/170 |
| 3,855,178 | 12/1974 | White et al. | 524/392 |
| 4,008,203 | 2/1977 | Jones | 524/259 |
| 4,432,340 | 2/1984 | Conant et al. | 126/390 |
| 4,503,168 | 3/1985 | Hartsing, Jr. | 523/100 |
| 4,526,920 | 7/1985 | Sakashita et al. | 524/850 |
| 4,539,370 | 9/1985 | Nouvertné et al. | 525/67 |
| 4,655,564 | 4/1987 | Czech | 351/41 |
| 4,673,708 | 6/1987 | Rock et al. | 525/66 |
| 4,695,602 | 9/1987 | Crosby et al. | 524/439 |

*Primary Examiner*—Ellis P. Robinson
*Assistant Examiner*—Archene Turner
*Attorney, Agent, or Firm*—Kinney & Lange, P.A.

[57] ABSTRACT

The present invention is a coffee carafe formed of a thin walled polymer such as polyetherimide or polyethersulphone and having characteristics permitting heating of the resinous carafe on a hot plate. The carafe is prepared by blow molding to form a thin wall construction.

11 Claims, 3 Drawing Sheets

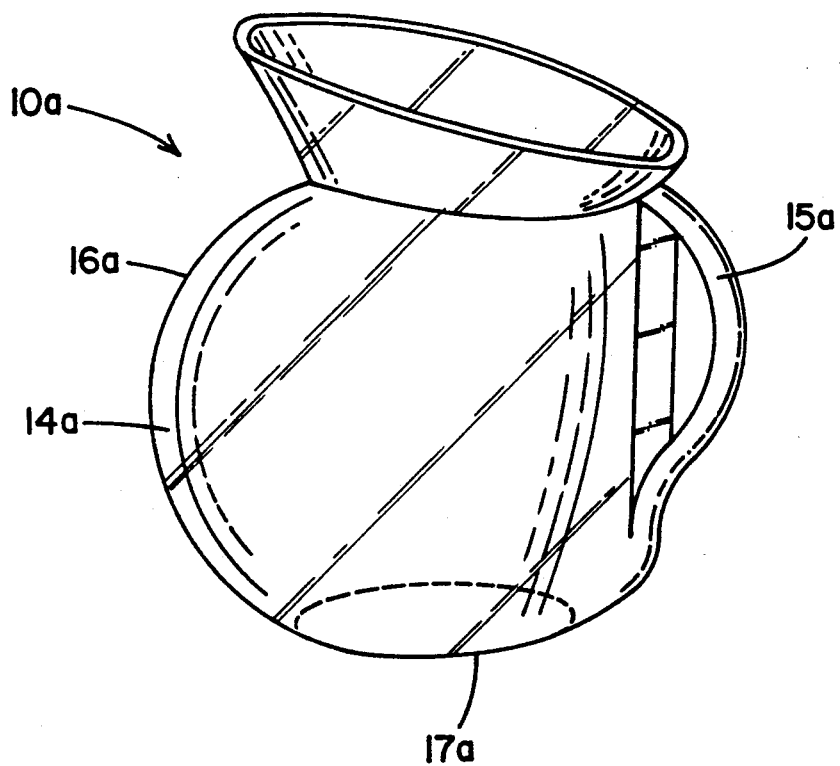

COFFEE CARAFE

BACKGROUND OF THE INVENTION

This is a continuation-in-part of U.S. patent application Ser. No. 157,746, filed Feb. 18, 1988, now U.S. Pat. No. 4,879,146.

FIELD OF THE INVENTION

The present invention relates to containers and particularly food containers suitable for heating on a hot plate.

Food containers suitable for heating have been available for many years and this technology is today a highly developed art. One type of food container has been the coffee carafe typically used with coffee brewers. The coffee brewer will generally have a compartment for heating of water to a brewing temperature. The water is then expelled into a portion of the device containing ground coffee beans. The hot water brews into highly palatable coffee. Such coffee brewers have generally included a coffee carafe with a glass bowl and a polymeric handle. The handle may be secured to the bowl by use of a retractable metal band. Alternatively, the polymeric handle may include a polymeric ring that is fused to the upper portion of the glass bowl. Coffee brewers and glass coffee carafes can today be found in most homes, offices and building facilities.

While the glass coffee carafe has been a useful item, it has possessed several disadvantages. The glass coffee carafe, of course, has been highly susceptible to breakage. For example, if a glass coffee carafe is dropped onto a counter or a floor surface, it shatters producing dangerous glass fragments, creating substantial liability for businesses as well as suppliers of the coffee carafe. Such glass coffee carafes have also been susceptible to absorption of coffee oils. The coffee oil over time discolors the glass leaving a substantial deposit. The deposit may adversely affect the flavor of the brewed coffee resulting in a stale coffee flavor.

Various attempts have been made to overcome these disadvantages of the glass coffee carafe. Such attempts in the past have been unsuccessful. One such attempt has involved a carafe having a bowl made of polysulfone. The polysulfone carafe was unsatisfactory and was changed to a composite structure which is now commercially marketed as a carafe including a lower portion constructed of metal and an upper portion constructed of polysulfone. This unit likewise includes a handle which may be secured in place by fusion of the polymers. While this construction overcomes, at least to a certain degree, the breakage problem encountered in glass carafes, it has its own inherent disadvantages. For example, a seam exists between the metal portion and the polysulfone portion. Such seam permits accumulation of foreign matter and thus creates potential for accumulation of bacteria and other unhealthful material. Further, the polysulfone tends to degrade with repeated heating and washing with detergent, becoming crazed, discolored and unappetizing.

While a variety of food containers have been provided in the past made of polymeric materials, for example, polyethylene, such containers have not been suitable for heating, particularly on a hot plate, since prior polymeric materials have tended to become fused when heating to temperatures, for example, in excess of 300° F. Illustrative is the polysulfone material.

Applicant has discovered that the disadvantages of the glass coffee carafe, the composite metal and polysulfone coffee carafes and the existing polymeric food containers can be overcome. The present invention provides a container, e.g. polymeric coffee carafe which is transparent, which may be heated to temperatures well in excess of 300° F. e.g. 375° F. and higher, and is not fragile. Moreover, the present carafe is not susceptible to absorption of coffee oils. In fact, if coffee is boiled dry in the present carafe, a mere swishing of water will remove the coffee residue.

SUMMARY OF THE PRESENT INVENTION

The present invention is a polymeric container formed by blow molding. The polymeric container may be constructed from a polyetherimide resin or polyethersulphone resin. In the method of making the present invention, a hollow cylindrical parison is first extruded of the resin with the parison weighing between about 80 and 110 grams. A blow tube is then inserted into the molten parison and a gaseous medium e.g. air at a pressure of about 100 p.s.i.g., is blown into the parison while the parison is disposed within a mold having the shape and size of the outside of the desired product. The parison is thus blown up much like a balloon until it is forced into shaping engagement with the mold. The blow molded product is then cooled to solidify the polymer and removed from the mold. The blow molded product then has the top surface cut away to provide the upper lip of the coffee carafe. Alternatively, the opening may be molded into carafe. The typical cycle is about 8 to 10 seconds. Alternatively, the product may be made by injection blow molding.

The lower surface of the present carafe may be coated such as with metal to improve distribution of heat from a hot plate. The metal coating may be applied by spray coating a composition on the surface to accept copper coating from an electroless copper bath. Chrome may then be electroplated over the copper coating.

The present carafe is heat stable to permit heating on a plate having a temperature of at least 190° F., typically a temperature of between 250° and 400° F. In one preferred embodiment a handle is molded into the carafe during the blow molding process. In another embodiment, a handle is attached to the bowl of the coffee carafe, for example with a retractable metal band. The product of the present invention is a container of blow molded construction having a thin wall bowl and a handle. The walls, for example, may have a thickness of at least about 0.01 inches and no more than 0.03 inches, preferably about 0.015 to 0.025 inches. The walls are of resin and are semi-rigid and non-fragile. The present carafe is heat stable to permit heating on a plate having a temperature of at least 190° F., typically a temperature of between 250° and 400° F. The lower surface of the carafe may be metal coated such as of copper and chrome.

IN THE DRAWINGS

FIG. 1 schematically illustrates a conventional coffee brewer including a coffee carafe of the present invention;

FIG. 3 illustrates another embodiment of the present coffee carafe.

DETAILED DESCRIPTION OF THE INVENTION

Figure 1:
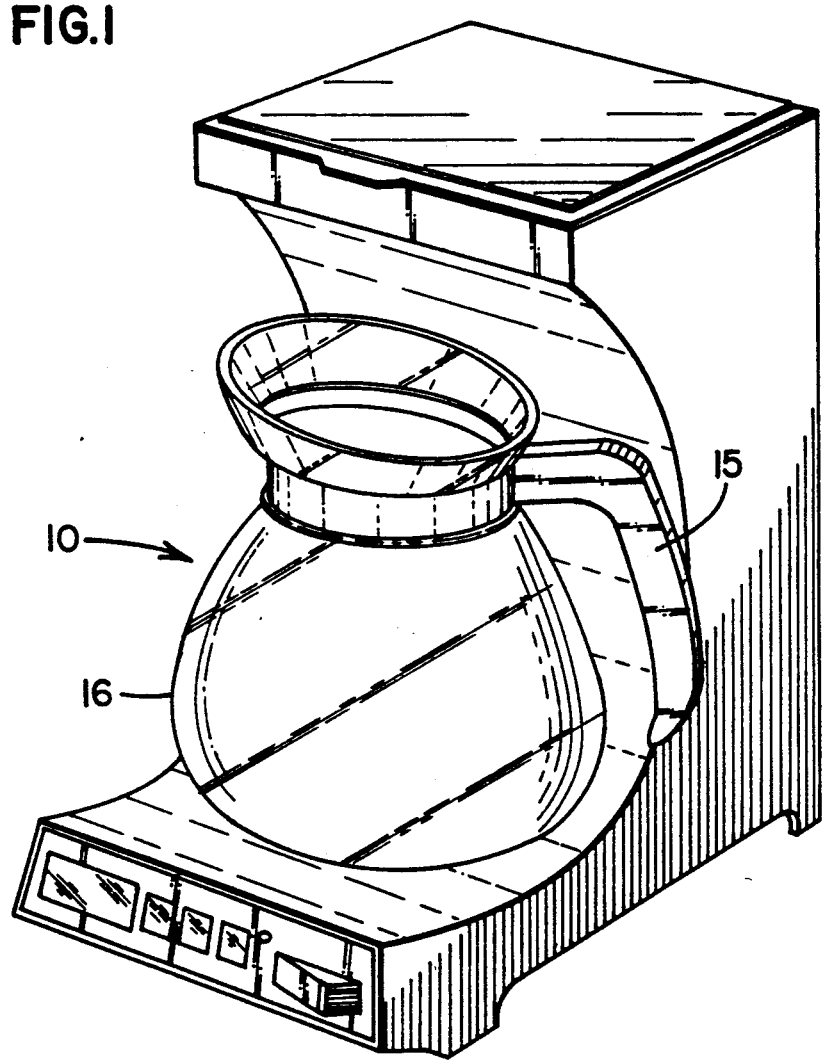
Figure 2:
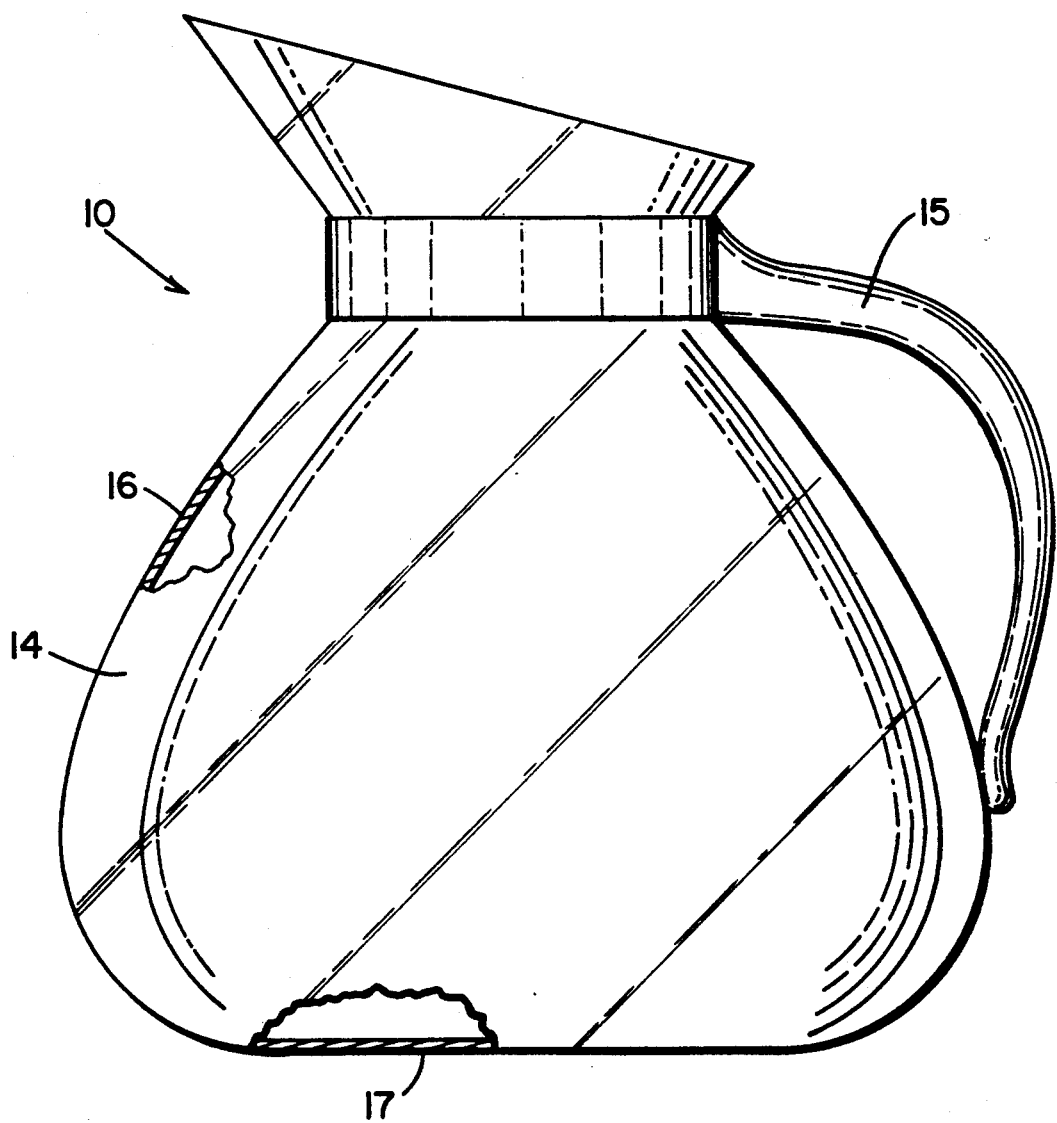
FIG. 2 illustrates a first embodiment of the present coffee carafe.

FIG. 1 illustrates the coffee carafe of the present invention in its normal use environment, positioned on the heating plate of a coffee brewer. The coffee carafe 10 (FIG. 2) of the present invention includes a bowl 14 and a handle 15. The bowl portion 15 is formed of a polymer of resin e.g. polyetherimide or polyethersulphone. The bowl is of a thin wall construction having a side wall thickness of at least about 0.009 inches and desirably less than 0.03 inches in thickness. The side wall 16 of the bowl 14 is desirably of about ½ of thickness of the base 17 of the bowl portion. The base may have a minimum thickness of at least 0.015 inches up to 0.06 inches and the side wall about 0.011 inches. The present carafe may itself be heated to temperatures of at least 375° F.

It has been found that the thickness is critical for several reasons. First, the base 17 in contact with a hot plate of the brewer must be thin to permit heat transfer through the resin. If the base is thickened, heat is accumulated in the lower side of the bottom wall. The present resins tend to be an insulating material that does not readily transfer heat. Thus, the unit is very inefficient if the bottom wall is too thick e.g. more than 0.06 inches. If the side wall 16 is thickened, for example, more than 0.06 inches in thickness, the side wall 16 tends to be fragile and crack and break.

The following table sets forth characteristics of the resin used in the present carafe:

TABLE

| Property | Test Method | Units | Values |
|---|---|---|---|
| GENERAL (polyethersulphone) | | | |
| Relative density | ASTM D792 | — | 1.37 |
| Retractive Index | — | — | 1.65 |
| Shrinkage of moulding | — | % | 0.6 |
| Glass content | — | % | 0 |
| MECHANICAL PROPERTIES | | | |
| Tensile strength at 68° F. | ASTM D638 | psi | 12,200 |
| Tensile strength at 300° F. | | | 8,000 |
| Tensile strength at 355° F. | | | 5,950 |
| Elongation at break | ASTM D6338 | % | 40-80 |
| Flexural strength | ASTM D790 | psi | 18,700 |
| Flexural modulus at 68° F. | ASTM D790 | psi | 855,600 |
| Flexural modulus at 300° F. | | | 841,100 |
| Flexural modulus at 355° F | | | 812,100 |
| Izod impact strength 6.4 mm (0.250 in) specimen notched | ASTM D256 | ft-lb/in | 1.42-2.25 |
| 6.4 mm (0.250 in) specimen un-notched | ASTM D256 | ft-lb/in | no break |
| Rockwell hardness | ASTM D785 | — | M88 |
| Taber abrasion 1 Kg load CS17 wheel | ASTM D1044 | 6 | 8 |
| THERMAL PROPERTIES | | | |
| Heat distortion temp. at 264 lbf/in2 | ASTM D648 | °F. | 397 |
| Vicat softening point | | | |
| 1 Kg (2.2 lbs) | ASTM D1525 | °F. | 439 |
| 6 Kg (11.0 lbs) | | °F. | 432 |
| Coefficient of linear thermal expansion | ASTM D696 | per deg C. | 5.5 × 10 |
| Underwriters Labs. temp. index | UL746 | °F. | 356 |

The polyetherimide used in the present invention may be produced as disclosed in U.S. Pat. Nos. 3,847,867; 3,847,869; 3,850,885; 3,852,242 or 3,855,178. These disclosures are incorporated herein by reference for purposes of teaching the production of the polyetherimide. The present polyetherimide desirably is an unreinforced polyetherimide having a molecular weight of about 19,000 and has a glass transition temperature in excess of 400° F.

The polyethersulphone of the present invention may be prepared as disclosed in U.S. Pat. No. 4,008,203. Such disclosure is incorporated herein by reference for the purpose of teaching the production of the present polyethersulphone. The polyethersulphone may have a tensile strength at 68° F. of 12,200 psi; at 300° F. of 8,000 psi; and at 355° F. of 5,950 psi measured according to ASTM D638. The present polyethersulphone may have a flexural strength of 18,700 psi as measured by ASTM D790. The polyethersulphone may have a heat distortion temperature at 1.82 of 264 lbf/in2 of 397° F. as measured by ASTM D648. The present polyethersulphone may have a Vicat softening point at 2.2 lbs. of about 439° F. as measured by ASTM D1525. The polyethersulphone may be Victrex 4100 series produced by Imperial Chemical Industries Limited of London, England.

The carafe of the present invention was tested under stress to determine if crazing would occur. At a temperature of 180° F. and a stress of 3200 p.s.i. no crazing occurred following 14 days. No crazing occurred at a temperature of 194° F. and a stress of 2400 p.s.i. even after 14 days. The carafe was found to have a Rockwell hardness of M109.

In making the present carafe, a parison is extruded in the shape of a hollow cylinder of a length suitable for blow molding the present coffee carafe. It has been found that approximately 80 to 110 grams of parison is appropriate for a coffee carafe of the conventional size. The parison is then blown to form a bubble shaped by the mold interior surface. The mold is then opened and the coffee carafe is opened at the upper end to provide a lip and pouring spout by cutting away the upper portion. A handle may be attached to the bowl. This may be of any of the conventional types used with respect to glass coffee carafes. For example, the conventional unit including a metal band attached to a plastic or resinous handle. The metal band may be tightened by a screw mechanism to securely grip the upper portion of the bowl. The mechanism includes a screw extruding though the band into a plug both of which fit into a socket molded into the handle. Alternatively, the handle may be a polymeric injection molded handle and ring with the ring being fused to the upper portion of the bowl such as by suitable adhesives or welding.

An alternative embodiment 10a of the present invention is illustrated in FIG. 3. In this instance, the entire carafe, including the side wall 16a, base 17a and handle 15a is formed during the blow molding process. The bowl may be of the same material as described with regard to the embodiment illustrated in FIGS. 1 and 2, however, in this instance, the handle is formed by molding a portion of the parison into the desired handle shape as the mold is closed around the parison. The bowl portion is then formed by blow molding the parison. The wall thicknesses may be as described with regard to the embodiment illustrated in FIG. 2. The handle portion may be ½ inch to ¾ inch in width and having a thickness of perhaps 1/16 to ⅛ of an inch.

As illustrated in FIG. 3, a thickened rib is provided along each edge of the handle. The thickened rib may be about ⅛ to 3/16 of an inch in thickness. This provides for strengthening stability of the handle during use.

While preferred embodiments are described, various modifications can be made without departing from the broader scope of the present invention.

What is claimed is:

1. A coffee carafe suitable for heating on a hot plate having a temperature of at least 190° F., said carafe comprising a bowl and an integral handle, said bowl being formed by blow molding, having a side wall with a thickness of between about 0.01 and 0.06 inches and having a base with a thickness of between about 0.015 up to 0.06 inches, said base consisting of a heat stable polymer to permit heating of said carafe on said hot plate, said polymer having a glass transition temperature of at least 400° F.

2. The coffee carafe of claim 1 wherein said carafe is heat stable on a coffee heating plate to a plate temperature of at least 375° F.

3. The coffee carafe of claim 1 suitable for heating on a hot plate having a temperature of about 250° to 400° F., said polymer having a stability to heat of a temperature of at least 375° F.

4. The coffee carafe of claim 3 wherein said bowl portion is blow molded of polyethersulphone resin and having a side wall thickness of between 0.01 and 0.03 inches and a base thickness of between 0.015 and 0.06 inches.

5. The coffee carafe of claim 4 wherein said handle is removably attached to said bowl.

6. The coffee carafe of claim 4 wherein said handle is molded integral with said bowl.

7. The coffee carafe of claim 4 wherein said bowl has a sidewall thickness of between 0.015 and 0.025 inches.

8. The coffee carafe of claim 7 wherein said handle includes a metal band which surrounds an upper portion of said bowl, said handle portion having adjustment means to tighten said hand into supporting engagement with said bowl.

9. The coffee carafe of claim 3 wherein said bowl includes a flared upper portion which provides a pouring spout.

10. The coffee carafe of claim 6 having a sidewall thickness of about 0.02 inches, said polyethersulphone being heat stable to permit heating of said carafe on a coffee heating plate having a temperature of at least 400° F.

11. A heat stable vessel suitable for heating on a hot plate of at least 190° F. said vessel comprising a bowl, said bowl having a side wall with a thickness of between 0.01 and 0.06 inches and a base with a thickness of between about 0.015 up to 0.06 inches, said base consisting of polyethersulphone, said vessel being heat stable to a temperature of about 350° F., said polyethersulphone having a glass transition temperature of at least 400° F.

* * * * *